(12) United States Patent
Xu

(10) Patent No.: US 8,799,718 B2
(45) Date of Patent: Aug. 5, 2014

(54) FAILURE SYSTEM FOR DOMAIN NAME SYSTEM CLIENT

(75) Inventor: Ce Xu, San Ramon, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 151 days.

(21) Appl. No.: 13/305,885

(22) Filed: Nov. 29, 2011

(65) Prior Publication Data

US 2012/0072569 A1 Mar. 22, 2012

Related U.S. Application Data

(63) Continuation of application No. 12/704,680, filed on Feb. 12, 2010, now Pat. No. 8,103,915.

(51) Int. Cl.
   *G06F 11/00* (2006.01)
(52) U.S. Cl.
   USPC .......................................................... 714/43
(58) Field of Classification Search
   USPC .......................................................... 714/43
   See application file for complete search history.

(56) References Cited

U.S. PATENT DOCUMENTS

| | | | |
|---|---|---|---|
| 6,834,302 B1 * | 12/2004 | Harvell | 709/224 |
| 7,567,582 B2 | 7/2009 | Westhead et al. | |
| 2004/0010584 A1 * | 1/2004 | Peterson et al. | 709/224 |
| 2006/0034267 A1 | 2/2006 | Torrey et al. | |
| 2006/0146816 A1 * | 7/2006 | Jain | 370/389 |
| 2007/0041393 A1 * | 2/2007 | Westhead et al. | 370/428 |
| 2010/0005191 A1 * | 1/2010 | Drako et al. | 709/238 |
| 2010/0269174 A1 | 10/2010 | Shelest | |
| 2010/0332680 A1 | 12/2010 | Anderson et al. | |

OTHER PUBLICATIONS

Mockapetris, "Domain Names—Implementation and Specification, RFC 1035," Network Working Group, http://www.ietf.org/rfc/rfc1034.txt, 111 pages, Nov. 1987.

* cited by examiner

*Primary Examiner* — Michael Maskulinski

(57) ABSTRACT

A method performed by a domain name service client includes storing DNS entries in a local cache; sending a DNS query to another device to obtain an update to one of the DNS entries; determining whether a DNS response is received; and resetting a time-to-live (TTL) timer associated with the one of the DNS entries when the DNS response is not received.

21 Claims, 11 Drawing Sheets

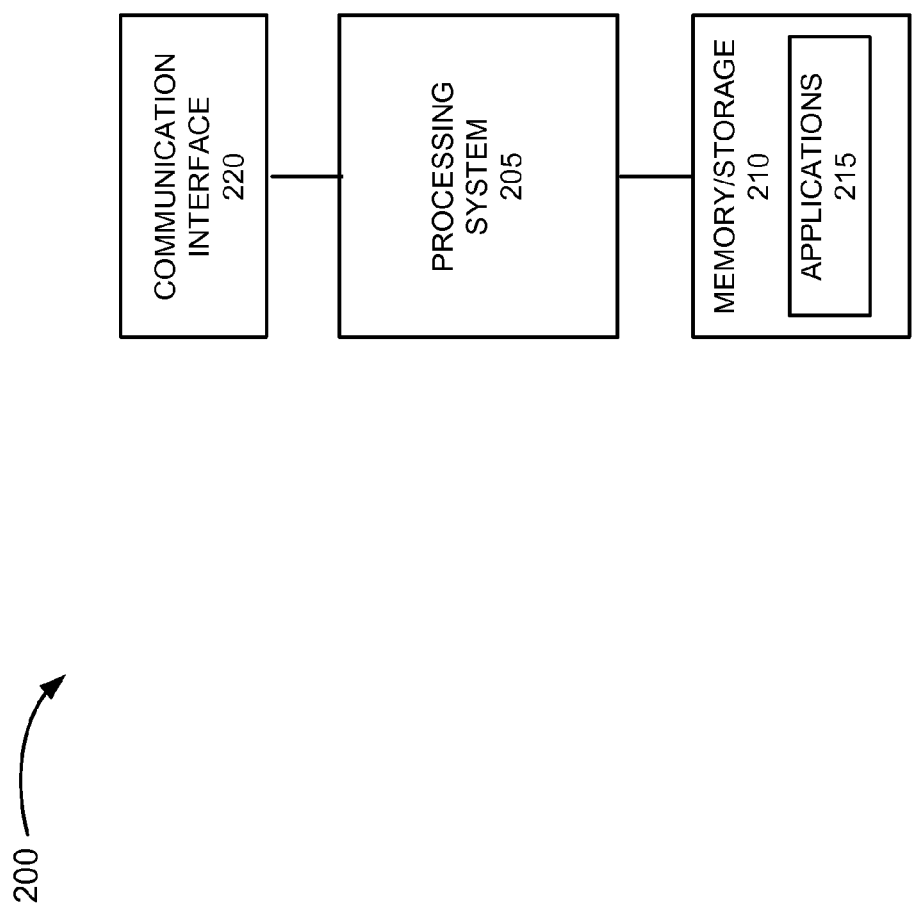

FAILURE SYSTEM FOR DOMAIN NAME SYSTEM CLIENT

CROSS REFERENCE TO RELATED APPLICATIONS

This application is a continuation of U.S. patent application Ser. No. 12/704,680 filed on Feb. 12, 2010, the disclosure of which is incorporated herein by reference in its entirety.

BACKGROUND

The Domain Name System (DNS) assigns domain names (or host names) to Internet Protocol (IP) addresses. The DNS is a distributed data system that utilizes a client-server architecture. Under this architecture, a DNS client sends a query to a DNS server to resolve (e.g., translate) a domain name into an IP address. The DNS server resolves the specific domain name within a domain space available in the DNS. In instances when the DNS client does not receive a response from the DNS server or receives an error response from the DNS server, the DNS client is unable to complete a communication process that invoked the DNS query.

BRIEF DESCRIPTION OF THE DRAWINGS

FIG. 2 is a diagram illustrating exemplary components of a device that may correspond to one or more of the devices in the exemplary environment depicted in FIGS. 1A and 1B;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

In an exemplary embodiment, a DNS client may manage DNS resolutions when network connection failures and DNS failures (e.g., a DNS server failure, etc.) prevents an updating of DNS entries in a local cache. In this way, communication between devices may not be impeded by such failures.

In an exemplary implementation, when the DNS client receives a DNS response to a DNS query, the DNS client may store DNS information (e.g., a DNS resource record (RR) included with the DNS response) in a local cache. Typically, the DNS (e.g., a DNS server) may assign a time-to-live (TTL) value to the RR included with the DNS response. The DNS client may consider the DNS entry (e.g., the RR) valid until the TTL time period expires, at which time the DNS client may initiate another DNS query to update the DNS entry. However, when the DNS client does not receive a DNS response to the other DNS query or receives the DNS response indicating some form of error, the DNS client may preserve the DNS entry that needs updating and may reset a TTL timer. That is, the DNS entry may be considered valid and the information may be used. This is in contrast to other approaches in which the DNS entry may remain invalid and communication processes may be halted until an update to the DNS entry is received.

In an exemplary embodiment, in the instance that the DNS (e.g., the DNS server) is unreachable and the DNS client does not receive a DNS response, the DNS client may preserve the DNS entry in the local cache and reset the TTL timer. Additionally, in the instance that a DNS response is received and the DNS response includes an empty RR and a Response Code (RCode) indicating a temporary failure condition (e.g., the DNS server may be busy, the DNS server may have failed, etc.), the DNS client may preserve the DNS entry in the local cache and may reset the TTL timer. Additionally, in the instance that a DNS response is received and the DNS responds includes an empty RR and an RCode indicating a permanent failure condition (e.g., an RR does not exist, a name error, etc.), the DNS client may flush the DNS entry in the local cache. Additionally, in the instance that a DNS response is received and the DNS response includes a non-empty RR, the DNS client may refresh the DNS entry with the RR from the DNS and reset the TTL timer.

Figure 1A:
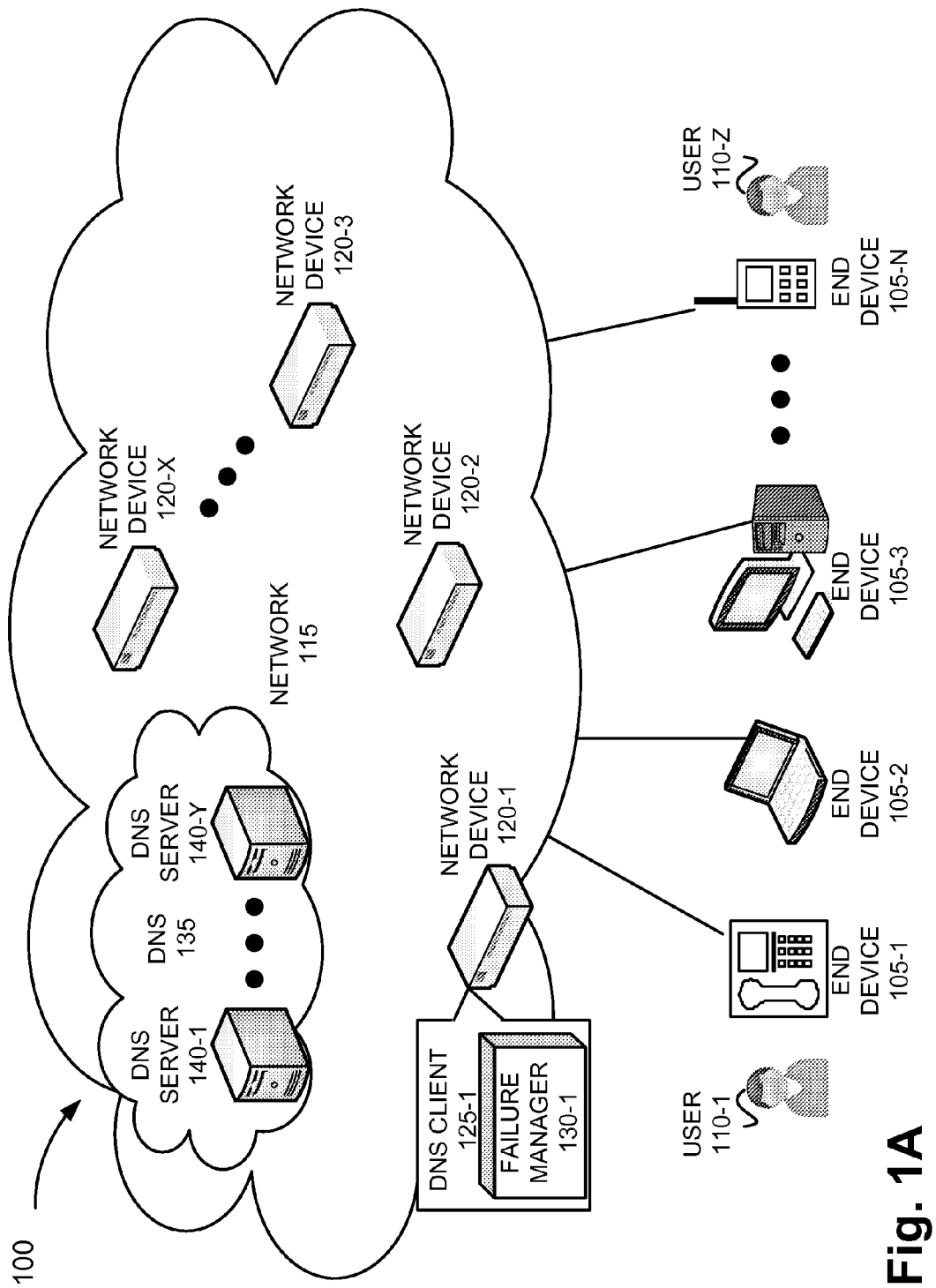
FIG. 1A is a diagram illustrating an exemplary environment in which an exemplary DNS client having a failure manager may be implemented.

FIG. 1A is a diagram illustrating an exemplary environment 100 in which a DNS client having a failure manager may be implemented. As illustrated in FIG. 1A, exemplary environment 100 may include end devices (EDs) 105-1 through 105-N (referred to generally as EDs 105 or ED 105), users 110-1 through 110-Z (referred to generally as users 110 or user 110), network 115, network devices 120-1 through 120-X (referred to generally as network devices 120 or network device 120), and DNS 135 that may include DNS servers 140-1 through 140-Y (referred to generally as DNS servers 140 or DNS server 140). Additionally, as illustrated in FIG. 1A, network device 120-1 may include a DNS client 125-1 (referred to generally as DNS client 125) having a failure manager 130-1 (referred to generally as failure manager 130).

The number of devices and configuration in environment 100 is exemplary and provided for simplicity. In practice, environment 100 may include more devices, fewer devices, different devices, and/or differently arranged devices than those illustrated in FIG. 1A. By way of example, but not limited thereto, one or more network devices 120, other than network device 120-1, and/or one or more EDs 105 may include DNS client 125 having a failure manager 130. Also, some functions described as being performed by a particular device may be performed by a different device or a combination of devices. Environment 100 may include wired and/or wireless connections among the devices illustrated.

ED 105 may include a device having the capability to communicate with other devices, systems, networks, and/or the like. By way of example, but not limited thereto, ED 105 may include an IP telephone, a wireless telephone (e.g., a cellular telephone, etc.), a computer (e.g., a laptop, a desktop, a palmtop, etc.), a personal digital assistant (PDA), a gaming device, a personal communication system (PCS) terminal, a pervasive computing device, a video playing device, a music playing device, a kiosk, and/or some other type of portable device, mobile device, handheld device, stationary device, and/or vehicle-based device.

Network 115 may include one or more networks of a variety of types. By way of example, but not limited thereto, network 115 may include a public network, a private network, a local area network (LAN), a wide area network (WAN), a telephone network, such as a Public Switched Telephone Network (PSTN) or a Public Land Mobile Network (PLMN), a data network, an IP Multimedia Subsystem (IMS) network, a Voice-Over IP (VOIP) network, a packet network, the Internet, an intranet, and/or some other type of wired network and/or wireless network, or combination thereof.

Network device 120 may include a device having the capability to communicate with other devices, systems, networks, and/or the like. By way of example, but not limited thereto, network device 120 may include a switch, a gateway, a router, a bridge, a server, or the like.

DNS client 125 may include a component capable of communicating with DNS 135 (e.g., DNS server 140) to resolve a DNS name or a network address. As previously described, DNS client 125 may include a failure manager 130. Failure manager 130 may manage DNS entries when network connection failures and DNS failures (e.g., a DNS server failure, etc.) prevent the updating of DNS entries in the local cache. Failure manager 130 may manage a local cache that stores DNS information and may manage TTL timers. DNS client 125 and failure manager 130 will be described in greater detail below.

DNS 135 may include a system that translates (or resolves) domain names to IP addresses, as well as other functionalities according to the DNS architecture. DNS server 140 may include a device associated with DNS 135. By way of example, but not limited thereto, DNS server 140 may correspond to a master name server, a slave name server, a stub server, a caching-only name server, a public DNS server, or a private DNS server.

Figure 1B:
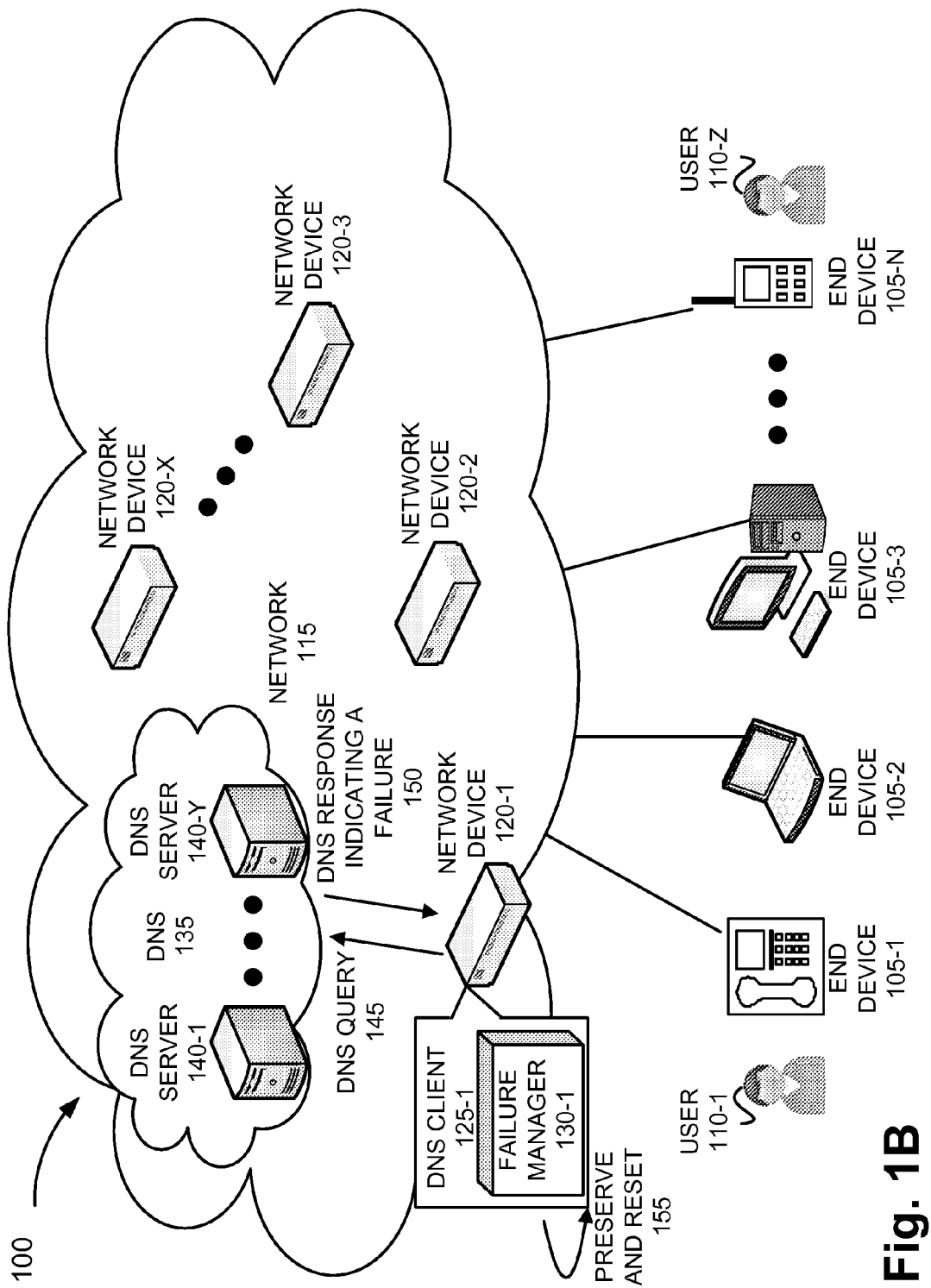
FIG. 1B is a diagram illustrating an exemplary operation of the exemplary DNS client having the failure manager.

FIG. 1B is a diagram illustrating an exemplary operation of DNS client 125 having failure manager 130. In an exemplary scenario, it may be assumed that a TTL time period has expired (or is about to expire) for a particular DNS entry stored in a local cache of network device 120-1. In response thereto, network device 120-1 may send a DNS query 145 to DNS 135 (e.g., to a DNS server 140) to update the DNS entry. DNS query 145 may be received by DNS server 140. However, DNS server 140 may be experiencing a temporary failure. In such an instance, DNS server 140 may send a DNS response indicating a failure 150 to network device 120-1. DNS response 150 may include an empty RR and an RCode indicating a server failure. DNS client 125-1 may receive DNS response indicating a failure 150. Based on this response, DNS client 125-1 may preserve the DNS entry in its local cache and reset the TTL timer 155 associated with the DNS entry.

As a result of the foregoing, communications may not be impeded when DNS entries may not be updated due to network connection failures and DNS failures. Rather, according to the exemplary embodiments described herein, a DNS client may revive a DNS entry that has not been updated (e.g., after a TTL has expired). Since an exemplary embodiment has been broadly described, a more detailed description is provided below.

FIG. 2 is a diagram illustrating exemplary components of a device 200 that may correspond to one or more of the devices in environment 100. For example, device 200 may correspond to ED 105, network device 120, DNS client 125, and/or DNS server 140. As illustrated, device 200 may include a processing system 205, memory/storage 210 including applications 215, and a communication interface 220. In other implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion thereof, of device 200, based on, for example, an operating system and/or various applications (e.g., applications 215).

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from device 200, such as, for example, a Universal Serial Bus (USB) memory stick, a hard disk, mass storage, off-line storage, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200. With reference to DNS client 125, memory/storage 210 may include one or more caches to store DNS information (e.g., a cache that stores DNS entries to allow DNS resolution).

Applications 215 may include software that provides various services or functions. By way of example, but not limited thereto, with reference to ED 105, applications 215 may include an e-mail application, a telephone application, a VOIP application, a camera application, a multi-media application, a visual voicemail application, a contacts application, a data organizer application, an instant messaging application, a texting application, a web browsing application, etc. By way of example, but not limited thereto, with reference to network device 120, applications 215 may include one or more applications for routing, providing security, translating and/or converting (e.g., network address translation, port address translation, protocol conversion, etc.), and/or other communication-related processing. By way of example, but not limited thereto, with reference to DNS server 140, applications 215 may include one or more applications for communication related processing associated with a DNS architecture (e.g., a DNS server application, etc.).

Communication interface 220 may permit device 200 to communicate with other devices, networks, systems and/or the like. Communication interface 220 may include a wireless interface and/or wired interface.

As described herein, device 200 may perform operations in response to processing system 205 executing software instructions contained in a computer-readable medium, such as memory/storage 210. By way of example, but not limited thereto, the software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

As previously described, in an exemplary implementation, DNS client 125 may include failure manager 130. Failure manger 130 may manage DNS entries when network connection failures and DNS failures may prevent an updating of DNS entries in the local cache. Described below are exemplary functional components and an exemplary table that may be implemented by an exemplary DNS client 125 and failure manager 130. As previously described, DNS client 125 may be implemented in one or more devices other than network devices 125 (e.g., EDs 105).

Figure 3A:
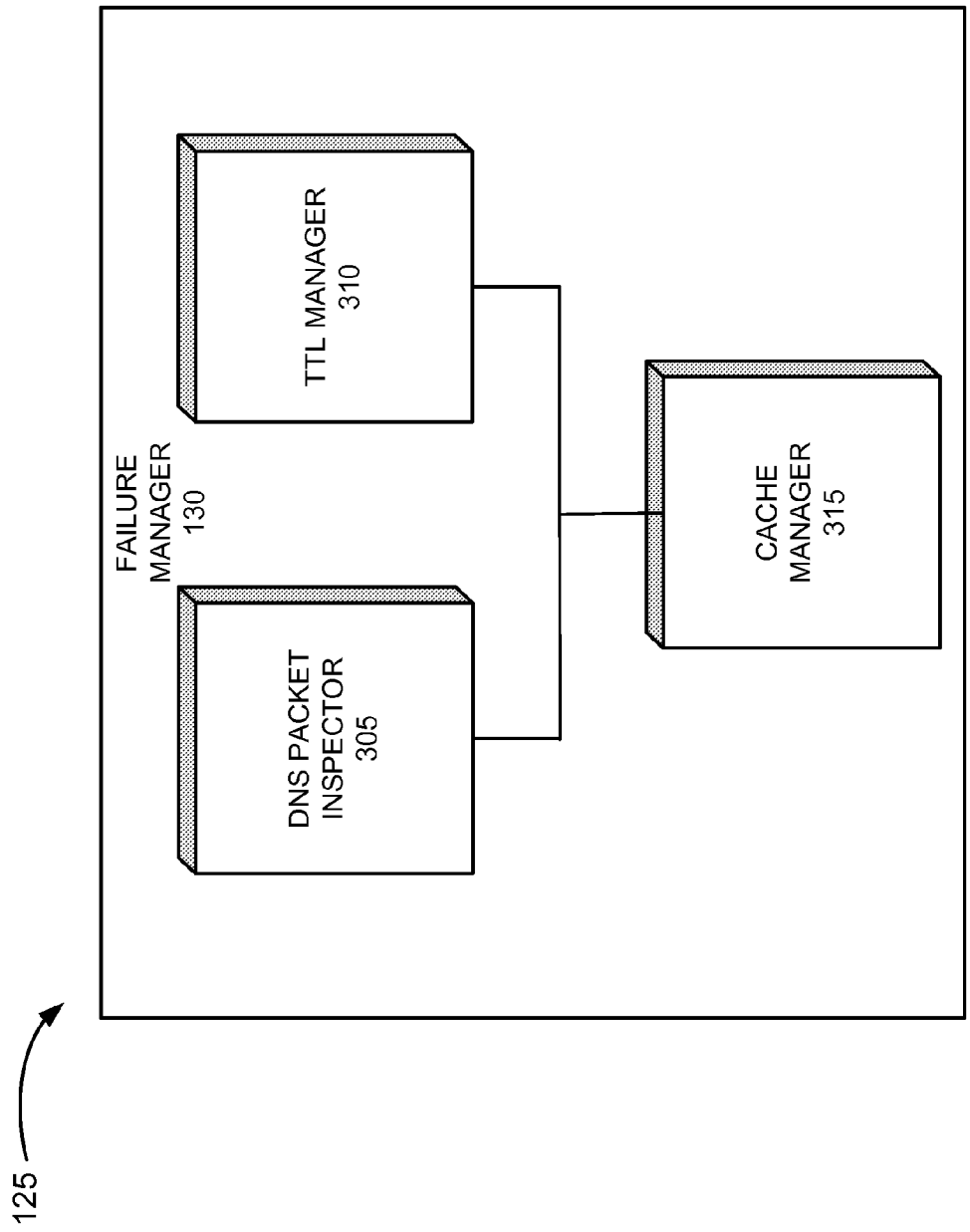
FIG. 3A is a diagram illustrating exemplary functional components associated with an exemplary implementation of the DNS client.

FIG. 3A is a diagram illustrating exemplary functional components associated with an exemplary implementation of DNS client 125. As illustrated, DNS client 125 may include failure manager 130 having a DNS Packet Inspector 305, a TTL manager 310, and a cache manager 315. DNS Packet Inspector 305, TTL manager 310, and/or cache manager 315, may be implemented as a combination of hardware (e.g., processing system 205, etc.) and software (e.g., applications 215, etc.) based on the components illustrated and described with respect to FIG. 2. Alternatively, DNS Packet Inspector 305, TTL manager 310, and/or cache manager 315 may be implemented as hardware based on the components illustrated and described with respect to FIG. 2. Alternatively, DNS Packet Inspector 305, TTL manager 310, and/or cache manager 315 may be implemented in a combination with firmware.

DNS Packet Inspector 305 may inspect a DNS packet. In an exemplary implementation, DNS Packet Inspector 305 may determine whether an RR is empty (or not present) and interpret RCodes included in a DNS packet. By way of example, but not limited thereto, according to the DNS protocol, DNS 135 (e.g., DNS servers 140) may include RRs and RCodes in DNS responses. RRs may define data types in the DNS and may include DNS information to permit DNS resolution. RCodes may indicate a particular condition or a particular status of a DNS operation, such as a query or an update. RCode values may correspond to an adopted standard (e.g., values adopted by the Internet Assigned Numbers Authority (IANA)) and/or correspond to a proprietary or a private RCode value scheme, extensions to a standard, or the like. By way of example, but not limited thereto, an RCode=0 may indicate no error, an RCode=1 may indicate a format error, RCode=2 may indicate a server failure, etc.

DNS Packet Inspector 305 may categorize particular RCodes. By way of example, but not limited thereto, in an exemplary implementations, RCodes may be categorized as representing a temporary failure condition or a permanent failure condition. In other implementations, other types of error or failure categories may be provisioned. In an exemplary implementation, DNS Packet Inspector 305 may consult an RCode table to determine whether an RCode value may be considered a temporary failure condition or a permanent failure condition. An exemplary RCode table is described in greater detail below.

TTL manager 310 may manage a TTL timer. As previously described, the TTL timer may govern a time in which DNS entries that have been cached may be considered valid. Typically, the TTL may be defined by a domain administrator associated with DNS 135 (e.g., associated with DNS server 140).

In an exemplary implementation, TTL manager 310 may reset the TTL timer even though a DNS entry has not been updated. By way of example, but not limited thereto, TTL manager 310 may reset the TTL timer when DNS client 125 determines that DNS 135 is unreachable (e.g., a DNS response to a DNS query is not received) and/or when a DNS response includes an empty RR and an RCode indicates a temporary failure condition. TTL manager 135 may also reset the TTL timer when DNS client 125 receives a DNS response that includes an RR (an update to a DNS entry). In other instances, TTL manager 310 may delete the TTL timer associated with a DNS entry when a DNS response includes an empty RR and an RCode indicates a permanent failure condition.

Cache manager 315 may manage a cache that stores DNS entries (e.g., RRs). By way of example, but not limited thereto, DNS client 125 may consult the cache to resolve a domain name to an IP address rather than querying a remote DNS server 140.

In an exemplary implementation, cache manager 315 may preserve a DNS entry when the DNS client 125 determines that DNS 135 is unreachable (e.g., a DNS response is not received, etc.) or when a DNS response includes an empty RR and an RCode indicates a temporary failure condition. In other instances, cache manager 315 may flush (i.e., delete) a DNS entry when the DNS response includes an empty RR and an RCode indicates a permanent failure condition. Cache manager 315 may refresh (or update) the cache when the DNS response includes an RR.

Although FIG. 3A illustrates exemplary functional components of DNS client 125, in other implementations, DNS client 125 may include fewer functional components, additional functional components, different functional components, and/or a different arrangement of functional components than those illustrated in FIG. 3A and described. Additionally, or alternatively, one or more operations described as being performed by a particular functional component may be performed by one or more other functional components, in addition to or instead of the particular functional component, and/or one or more functional components may be combined.

Figure 3B:
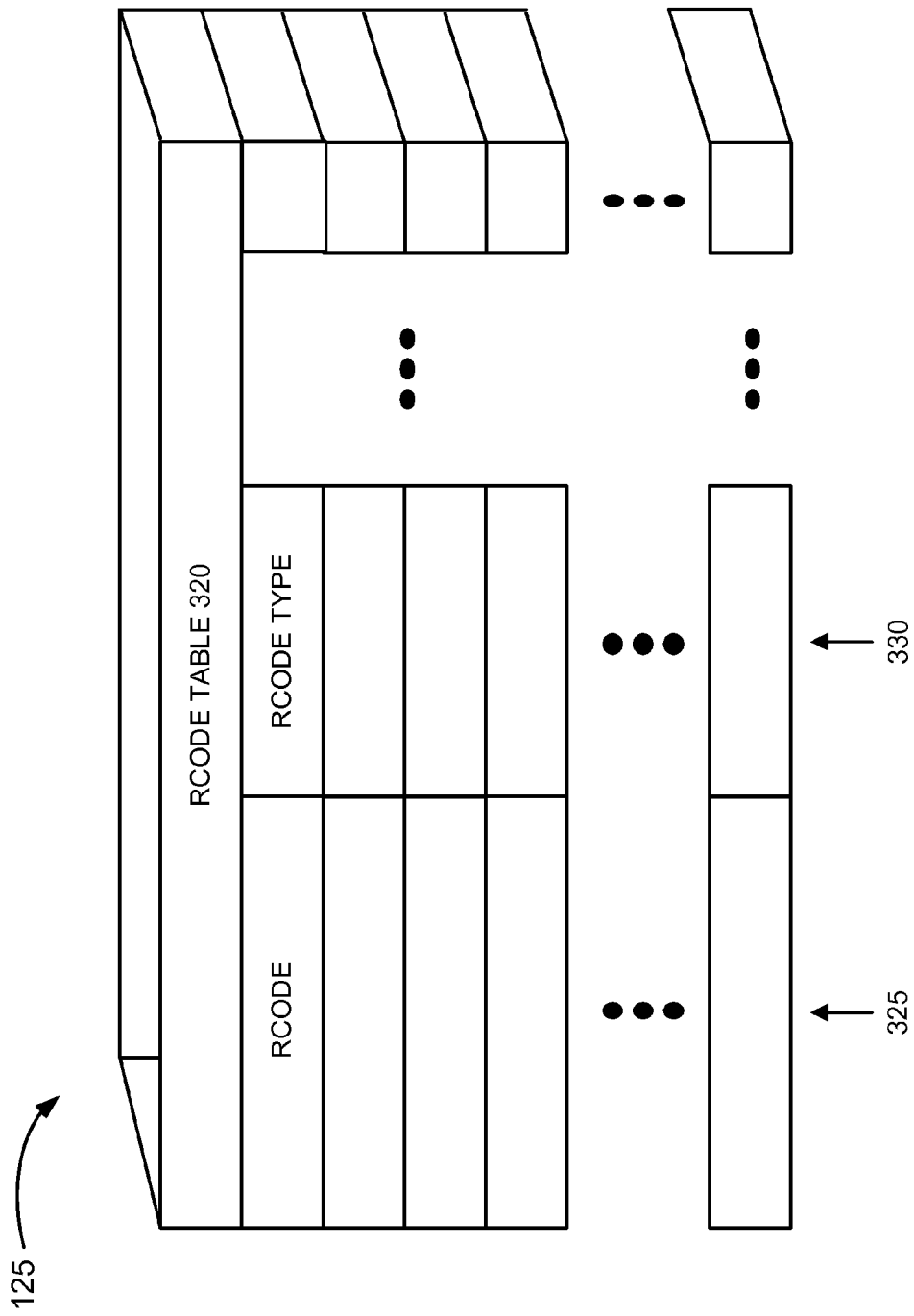
FIG. 3B is a diagram illustrating an exemplary RCode table.

FIG. 3B is a diagram illustrating an exemplary RCode table 320. The term "table," as used herein is intended to be broadly interpreted to include an arrangement of data or a data structure. In an exemplary embodiment, DNS client 125 may store RCode table 320. As illustrated, by way of example, but not limited thereto, RCode table 320 may include an RCode field 325 and an RCode type field 330.

In other implementations, RCode table 320 may include additional fields, fewer fields, and/or different fields than those illustrated in FIG. 3B and described. For example, RCode table 320 may store a field that indicates a duration of time that has transpired before the last update or some other information (e.g., a value indicating a measure of how static or how volatile an IP address may be (e.g., over a certain period of time)) in which DNS client 125 may determine whether to preserve or flush a DNS entry and/or whether to reset the TTL timer or not. For example, the more static the IP address, the greater the probability that the DNS entry has valid information, in which case, the TTL timer may be reset and the DNS entry may be preserved. Conversely, the less static or the more volatile the IP address, DNS client 125 may limit the number of times the TTL timer may be reset, etc.

RCode field 325 may indicate an RCode value. In an exemplary implementation, RCodes may correspond to numerical values. As previously described, RCode values may correspond to an adopted standard (e.g., values adopted by the IANA according to various Request For Comments (RFCs)) and/or correspond to a proprietary or a private RCode value scheme, an extension to a standard, or the like.

RCode type field 330 may indicate a type of RCode based on a meaning associated with an RCode value. A network administrator may assign an RCode type to a particular RCode. In an exemplary implementation, RCode values may be assigned an RCode type corresponding to temporary failure condition or a permanent failure condition. In other exemplary implementations, other types of error categories and/or failure categories may be created based on the RCode values (e.g., DNS server errors, DNS format errors, etc.). By way of example, but not limited thereto, a temporary failure condition may correspond to a DNS server failure, a DNS server which may be busy, a badly or incorrectly formatted DNS query, etc. Further, by way of example, but not limited thereto, a permanent failure condition may correspond to an RR that does not exist, a non-existent domain, etc.

FIGS. 4A-4D are diagrams illustrating exemplary operations that may be performed by DNS client 125 when a DNS failure or a network connection failure prevents a DNS entry from being updated.

Figure 4A:
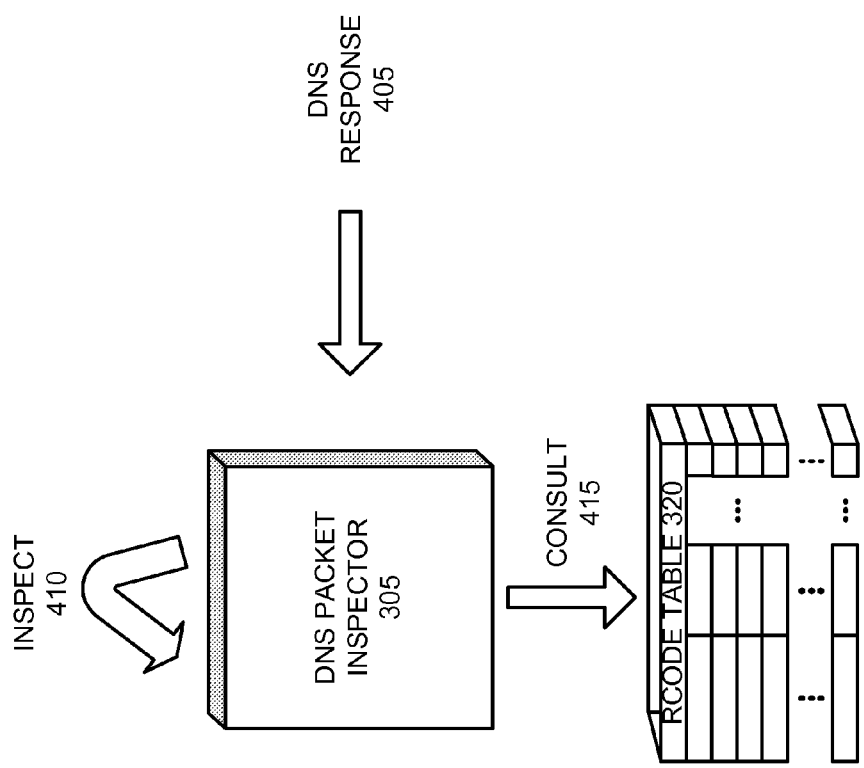
FIGS. 4A-4D are diagrams illustrating exemplary operations that may be performed by the DNS client when a failure prevents a DNS entry from being updated.

Referring to FIG. 4A, assume that DNS client 125 may receive a DNS response 405 in response to a DNS query (not illustrated). DNS Packet Inspector 305 may inspect 410 DNS response 405 to determine whether an RR is present and to interpret an RCode value. In an exemplary implementation, when DNS response 405 does not include an RR, DNS Packet Inspector 305 may consult 415 RCode Table 320 (e.g., RCode type field 330) to determine whether the RCode value corresponds to a temporary failure condition or a permanent failure condition. DNS Packet Inspector 305 may provide commands to TTL manager 310 and cache manager 315 based on the failure condition determined.

Figure 4B:
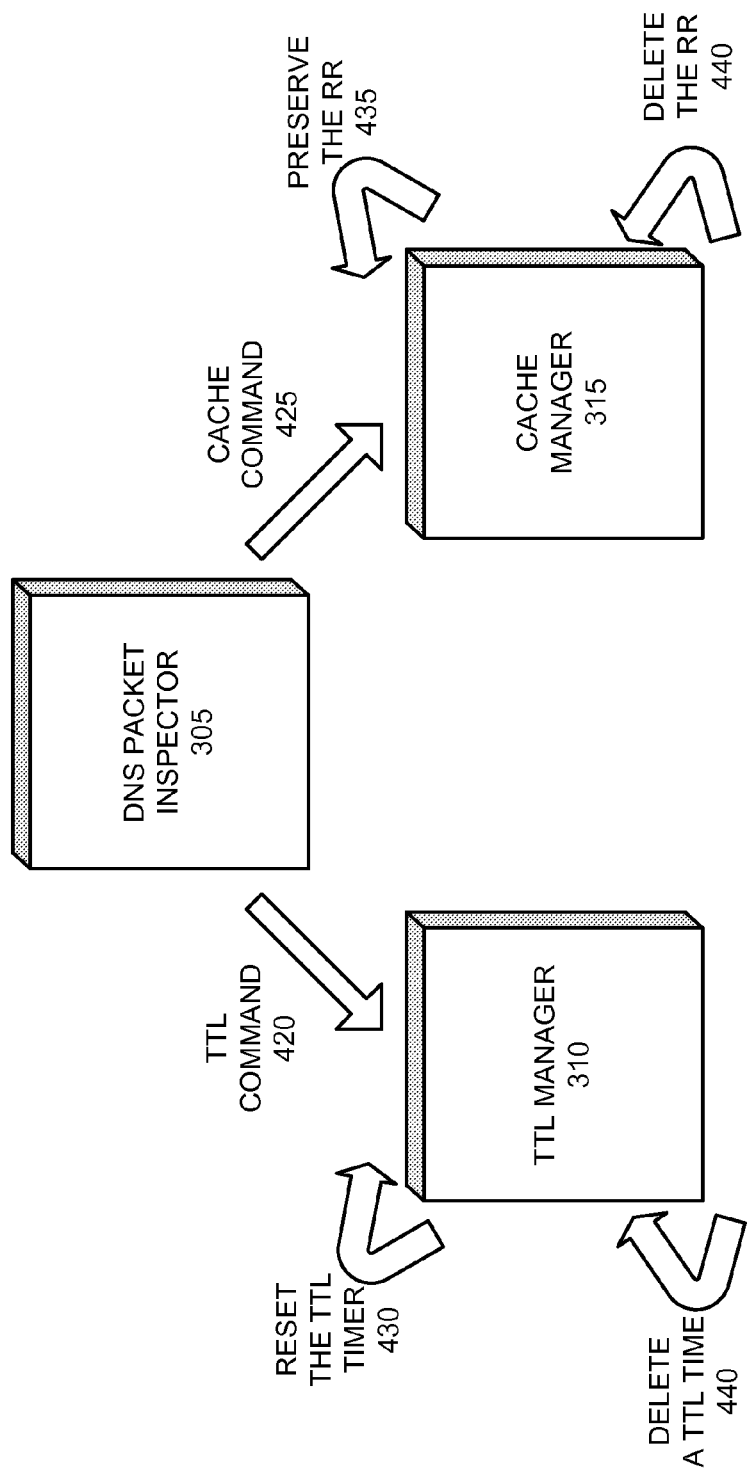

Referring to FIG. 4B, when DNS Packet Inspector 305 determines the type of failure condition (e.g., temporary or permanent), DNS Packet Inspector 305 may issue a TTL command 420 to TTL manager 310 and a cache command 425 to cache manager 315. For example, when the RCode is determined to correspond to a temporary failure condition, TTL command 420 may indicate to reset the TTL timer. In this instance, TTL manager 310 may reset the TTL timer 430 associated with the appropriate DNS entry. Additionally, when the RCode is determined to correspond to a temporary failure condition, cache command 425 may indicate to preserve the RR in the cache. In this instance, cache manager 315 may preserve (i.e., continue to store) the RR 435 associated with the appropriate DNS entry.

In another example, when the RCode is determined to correspond to a permanent failure condition, TTL command 420 may indicate to delete the TTL timer associated with the appropriate RR. In this instance, TTL manager 310 may delete a TTL time 440 associated with the appropriate DNS entry. Additionally, when the RCode is determined to correspond to a permanent failure condition, cache command 425 may indicate to flush the RR in the cache. In this instance, cache manager 315 may delete the RR 445 associated with the appropriate DNS entry.

In other circumstances, DNS client 125 may not receive a DNS response from DNS 135 when a DNS query is sent. For example, there may be a network connection failure between a device hosting DNS client 125 (e.g., network device 120) and DNS server 140.

Figure 4C:
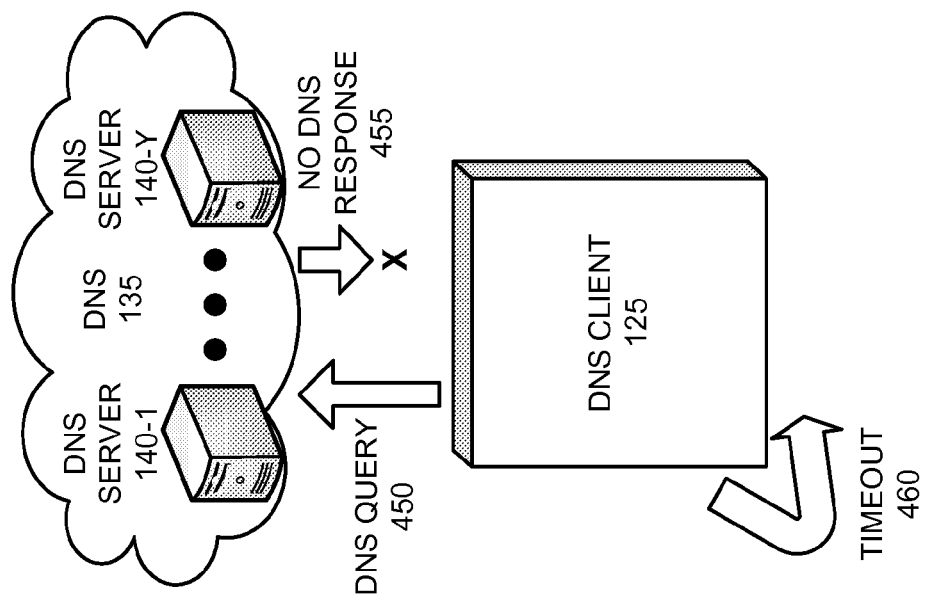

Referring to FIG. 4C, it may be assumed that DNS client 125 sends a DNS query 450 to DNS 135. In this instance, however, no DNS response 455 may be received by DNS client 125, as indicated by the "X" in FIG. 4C. DNS client 125 may have a certain time period for waiting for a DNS response, after which, a timeout 460 may occur.

Figure 4D:
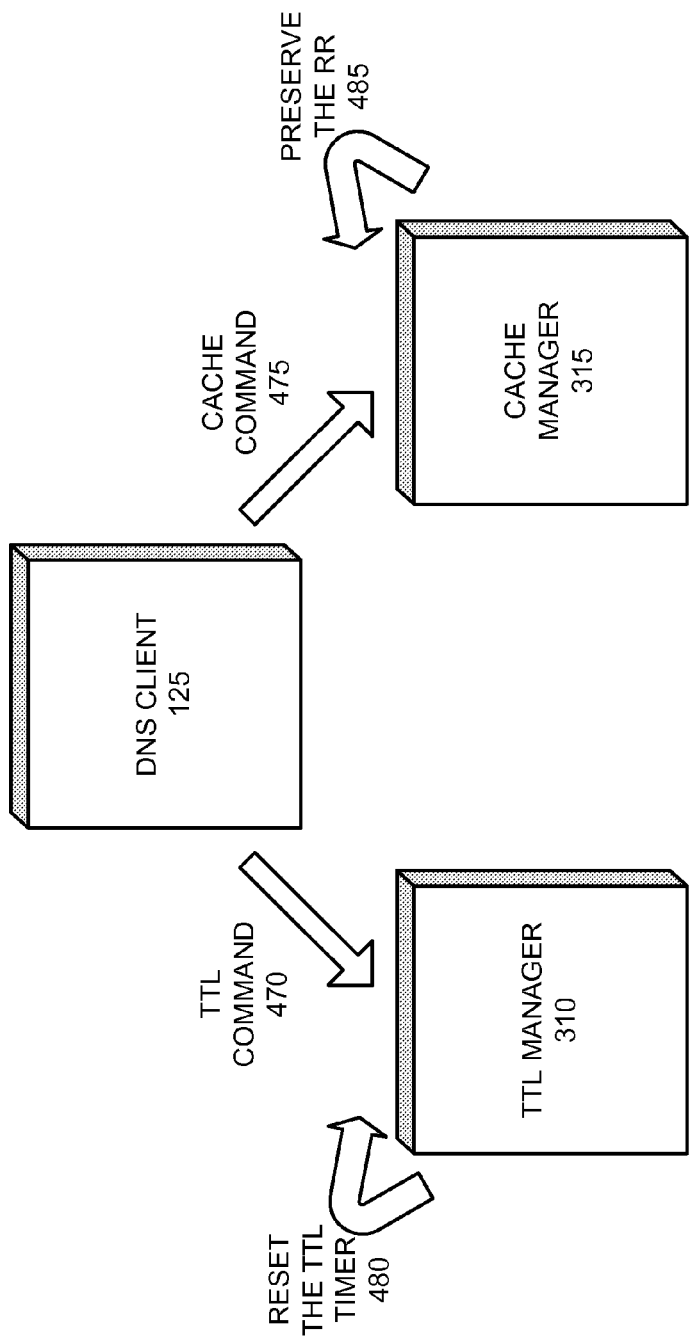

Referring to FIG. 4D, with knowledge that a DNS response has not been received, DNS client 125 (e.g., DNS Packet Inspector 305) may issue a TTL command 470 to TTL manager 310 and a cache command 475 to cache manager 315. In this instance, TTL manager 310 may reset the TTL timer 480 associated with the appropriate DNS entry and cache manager 315 may preserve the RR 485 associated with the appropriate DNS entry.

Further, as previously described, in the instance a DNS response includes an RR, and the RCode does not indicate a failure condition, DNS client 125 may refresh the DNS entry stored in cache with the updated DNS information and may reset the TTL timer.

Figure 5A:
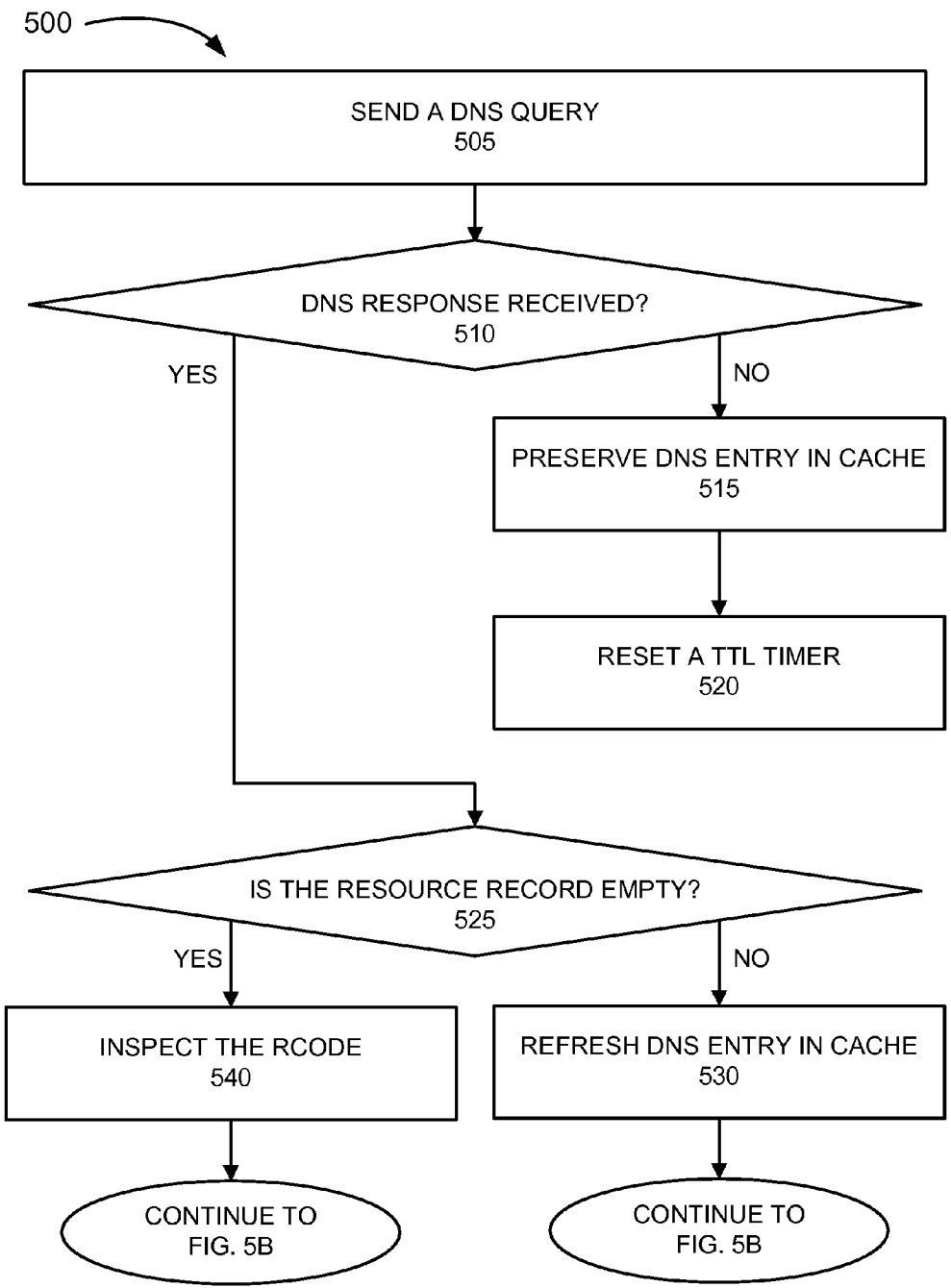
FIGS. 5A and 5B are flow diagrams illustrating an exemplary process for managing DNS entries when a failure prevents the DNS entries from being updated.
Figure 5B:
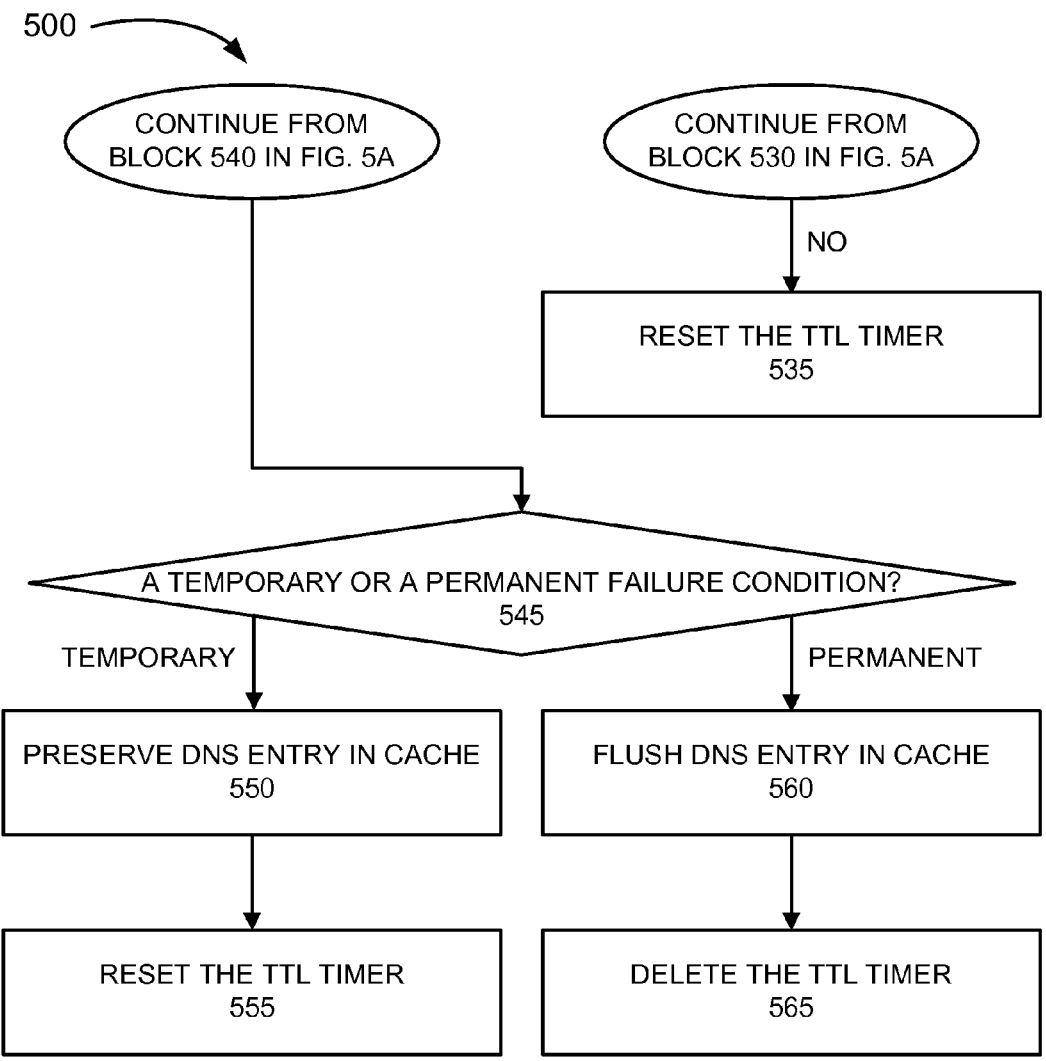

FIGS. 5A and 5B are flow diagrams illustrating an exemplary process 500 for managing DNS entries when a failure prevents the DNS entries from being updated. In an exemplary implementation, process 500 may be performed by network device 120, which includes DNS client 125 having failure manager 130. In other implementations, process 500 may be performed by another device that includes DNS client 125 having failure manager 130 (e.g., ED 105, etc.).

Process 500 may include sending a DNS query (block 505). For example, as previously illustrated and described, DNS client 125 may send a DNS query to DNS 135. In an exemplary implementation, the DNS query may be requesting an update to a DNS entry (e.g., an RR) stored in a cache. The DNS entry may be expired or soon to be expired according to a TTL timer.

It may be determined whether a DNS response is received (block 510). For example, DNS client 125 may determine whether a DNS response is received from DNS 135. In an exemplary implementation, DNS client 125 may include a timeout mechanism (e.g., to determine whether a DNS response is received within a certain period of time).

If it is determined that a DNS response is not received (block 510—NO), a DNS entry in the cache may be preserved (block 515) and a TTL timer may be reset (block 520). By way of example, but not limited thereto, DNS client 125 (e.g., cache manager 315 and TTL manager 310) may preserve the appropriate DNS entry in the cache and may reset the TTL timer associated with the appropriate DNS entry. In such an instance, DNS client 125 may consider the DNS entry valid and utilize the DNS entry when invoked by a communication process (e.g., a VOIP call, etc.).

If it is determined that a DNS response is received (block 510—YES), it may be determined whether an RR is empty (block 525). For example, DNS client 125 (e.g., DNS Packet Inspector 305) may determine whether an RR is present in the DNS response.

If it is determined that the RR is not empty (block 525—NO), a DNS entry in the cache may be preserved (block 530) and a TTL timer may be reset (block 535—FIG. 5B). By way of example, but not limited thereto, DNS client 125 (e.g., cache manager 315 and TTL manager 310) may refresh the appropriate DNS entry in the cache based on the RR included with the DNS response received, and may reset the TTL timer associated with the appropriate DNS entry. In such an instance, DNS client 125 may consider the DNS entry valid and utilize the DNS entry when invoked by a communication process (e.g., a VOIP call, etc.).

Referring to FIG. 5A, if it is determined that the RR is empty (block 525—YES), the RCode may be inspected (block 540). For example, DNS client 125 (e.g., DNS Packet Inspector 305) may inspect an RCode included with the DNS response received and obtain the RCode value.

Referring to FIG. 5B, it may be determined whether the RCode value corresponds to a temporary failure condition or a permanent failure condition (block 545). By way of example, but not limited thereto, DNS Packet Inspector 305 may compare the RCode value to entries in RCode table 320 (e.g., RCode fields 325) to find a match. When a match is found, DNS Packet Inspector 305 may access the corresponding entry in RCode type field 330 to determine whether the RCode value corresponds to a temporary failure condition or a permanent failure condition.

If it is determined that the RCode value corresponds to a temporary failure condition (block 545—TEMPORARY), a DNS entry in the cache may be preserved (block 550) and a TTL timer may be reset (block 555). By way of example, but not limited thereto, DNS client 125 (e.g., cache manager 315 and TTL manager 310) may preserve the appropriate DNS entry in the cache and may reset the TTL timer associated with the appropriate DNS entry. In such an instance, DNS client 125 may consider the DNS entry valid and utilize the DNS entry when invoked by a communication process (e.g., a VOIP call, etc.).

If it is determined that the RCode value corresponds to a permanent failure condition (block 545—PERMANENT), a DNS entry may be flushed from the cache (block 560) and a TTL timer may be deleted (block 565). By way of example, but not limited thereto, DNS client 125 (e.g., cache manager 315 and TTL manager 310) may flush (e.g., delete) the appropriate DNS entry in the cache and may delete the TTL timer associated with the appropriate DNS entry.

Although FIGS. 5A and 5B illustrate an exemplary process 500 for, in other implementations, process 500 may include additional operations, fewer operations, and/or different operations than those illustrated in FIGS. 5A and 5B and described. For example, process 500 may utilize error categories and/or failure categories that are different from temporary and permanent failure categories, as described.

The foregoing description of implementations provides illustration, but is not intended to be exhaustive or to limit the implementations to the precise form disclosed. Accordingly, modifications to the implementations described herein may be possible. For example, the processes described herein may be applicable to reverse DNS updates in which a DNS failure or a network connection failure prevents an update to a host name or a domain name associated with an IP address.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A and 5B, the order of the blocks may be modified in other implementations. Further, non-dependent blocks may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
    storing, by a domain name system (DNS) device, DNS entries in a local cache;
    sending, by the DNS device, a DNS query to another device to obtain an update to one of the DNS entries;
    determining, by the DNS device, whether a DNS response for the DNS query is received;
    reading, by the DNS device, a response code value included in the DNS response in response to determining that the DNS response is received; and
    selecting, by the DNS device, an error category from a plurality of error categories based on the reading of the response code value, wherein the error category represents a type of error for two or more response code values and the response code value is one of the two or more response code values.

2. The method of claim 1, wherein if the DNS response is received, the method further comprises:
    determining whether a DNS resource record (RR) included in the DNS response is empty or not; and wherein the reading comprises:
    reading the response code value from the DNS response in response to determining that the DNS RR is empty.

3. The method of claim 1, wherein if the DNS response is not received, the method further comprises:
    continuing to store the one of the DNS entries; and
    resetting a time-to-live timer associated with the one of the DNS entries.

4. The method of claim 1, further comprising:
    continuing to store the one of the DNS entries based on the selected error category; and
    resetting a time-to-live timer associated with the one of the DNS entries based on the selected error category.

5. The method of claim 1, further comprising:
    deleting the one of the DNS entries based on the selected error category; and
    deleting a time-to-live timer associated with the one of the DNS entries based on the selected error category.

6. The method of claim 1, wherein if the DNS response is received, the method further comprises:
    determining whether a DNS resource record (RR) included in the DNS response is empty or not;
    updating the one of the DNS entries in response to determining that the DNS RR is not empty; and
    resetting a time-to-live timer associated with the one of the DNS entries.

7. The method of claim 1, further comprising:
reading the selected error category.

8. The method of claim 1, wherein the error category represents one of a temporary condition or a permanent condition.

9. A device comprising:
a domain name system (DNS) client;
one or more memories to store instructions; and
one or more processors to execute the instructions in the one or more memories to:
store DNS entries;
send a DNS query to another device to obtain an update to one of the DNS entries;
determine whether a DNS response to the DNS query is received;
read a response code value included in the DNS response in response to a determination that the DNS response is received; and
select an error category from a plurality of error categories based on a reading of the response code value, wherein the error category represents a type of error for two or more response code values and the response code value is one of the two or more response code values.

10. The device of claim 9, wherein if a determination is that the DNS response is not received, the one or more processors are to execute instructions to:
continue to store the one of the DNS entries; and
reset a time-to-live timer associated with the one of the DNS entries.

11. The device of claim 9, wherein if the determination is that the DNS response is received, the one or more processors are to execute instructions to:
determine whether a DNS resource record (RR) included in the DNS response is empty or not; and
read the response code value from the DNS response in response to a determination that the DNS RR is empty.

12. The device of claim 9, wherein the one or more processors are to execute instructions to:
continue to store the one of the DNS entries based on the selected error category; and
reset a time-to-live timer associated with the one of the DNS entries based on the selected error category.

13. The device of claim 9, wherein if the determination is that the DNS response is received, the one or more processors are to execute instructions to:
determine whether a DNS resource record (RR) included in the DNS response is empty or not;
update the one of the DNS entries in response to a determination that the DNS RR is not empty; and
reset a time-to-live timer associated with the one of the DNS entries.

14. The device of claim 9, wherein the one or more processors are to execute instructions to:
delete the one of the DNS entries based on the selected error category; and
delete a time-to-live timer associated with the one of the DNS entries based on the selected error category.

15. The device of claim 9, wherein the one or more processors are to execute instructions to:
read the selected error category.

16. The device of claim 9, wherein the error category corresponds to errors pertaining to a DNS server.

17. A non-transitory storage medium storing instructions executable by at least one computational device to:
manage domain name system (DNS) entries in a cache associated with a DNS client;
send a DNS query to another device to obtain an update to one of the DNS entries;
read a response code value included in a DNS response; and
select an error category from a plurality of error categories based on a reading of the response code value, wherein the error category represents a type of error for two or more response code values and the response code value is one of the two or more response code values.

18. The non-transitory storage medium of claim 17, further comprising one or more instructions to:
continue to store the one of the DNS entries based on the selected error category; and
reset a time-to-live timer associated with the one of the DNS entries based on the selected error category.

19. The non-transitory storage medium of claim 17, further comprising one or more instructions to:
determine whether a DNS resource record (RR) included in the DNS response is empty or not;
update the one of the DNS entries in response to a determination that the DNS RR is not empty; and
reset a time-to-live timer associated with the one of the DNS entries.

20. The non-transitory storage medium of claim 17, further comprising one or more instructions to:
read the error category.

21. A method comprising:
storing, by a domain name system (DNS) device, DNS entries in a local cache;
sending, by the DNS device, a DNS query to another device to obtain an update to one of the DNS entries;
determining, by the DNS device, whether a DNS response for the DNS query is received;
reading, by the DNS device, a response code value included in the DNS response in response to determining that the DNS response is received;
selecting, by the DNS device, an error category corresponding to the response code value based on the reading, wherein if the DNS response is received, the method further comprises:
determining whether a DNS resource record (RR) included in the DNS response is empty or not; and wherein the reading comprises:
reading the response code value from the DNS response in response to determining that the DNS RR is empty.

* * * * *